United States Patent [19]
Kurii et al.

[11] 3,949,236
[45] Apr. 6, 1976

[54] ENGINE AUTOMATIC CONTROL SYSTEM FOR VEHICLES

[75] Inventors: Masaaki Kurii; Kiyoshi Kobari, both of Kasugai; Osamu Yanagi, Tokai, all of Japan

[73] Assignees: Nippondenso Co., Ltd., Kariya; Toyota Jidosha Hanbai Kabushiki Kaisha, Nagoya; Kabushiki Kaisha Tokai Rika Denki Seisakusho, Nishikasugai, all of Japan

[22] Filed: Oct. 18, 1974

[21] Appl. No.: 516,022

[30] Foreign Application Priority Data
Oct. 24, 1973  Japan.................. 48-123398[U]

[52] U.S. Cl.............................. 290/38 R; 290/48
[51] Int. Cl.²............................................. H02P 9/04
[58] Field of Search............ 290/37, 38, 40, 41, 47, 290/48, 50; 123/146 SD

[56] References Cited
UNITED STATES PATENTS
3,731,108  5/1973  Kobara et al...................... 290/38

*Primary Examiner*—Herman Hohauser
*Attorney, Agent, or Firm*—Moonray Kojima

[57] ABSTRACT

In an engine automatic control system for a vehicle for automatically connecting an electric source in the form of a battery with an engine starter and an ignition circuit in response to disengaging operation of a clutch device of the vehicle, for maintaining the ignition circuit conductive while the vehicle runs, and for automatically making the ignition circuit nonconductive when the vehicle is arrested, the engine control system comprises a setting circuit interposed between an ignition switch and the ignition circuit for selectively setting the engine control system to its operative condition and a cancelling circuit coupled with the setting circuit for automatically cancelling the operative condition of the engine control system when the stored voltage of the battery is lowered to or below a predetermined low value.

10 Claims, 1 Drawing Figure

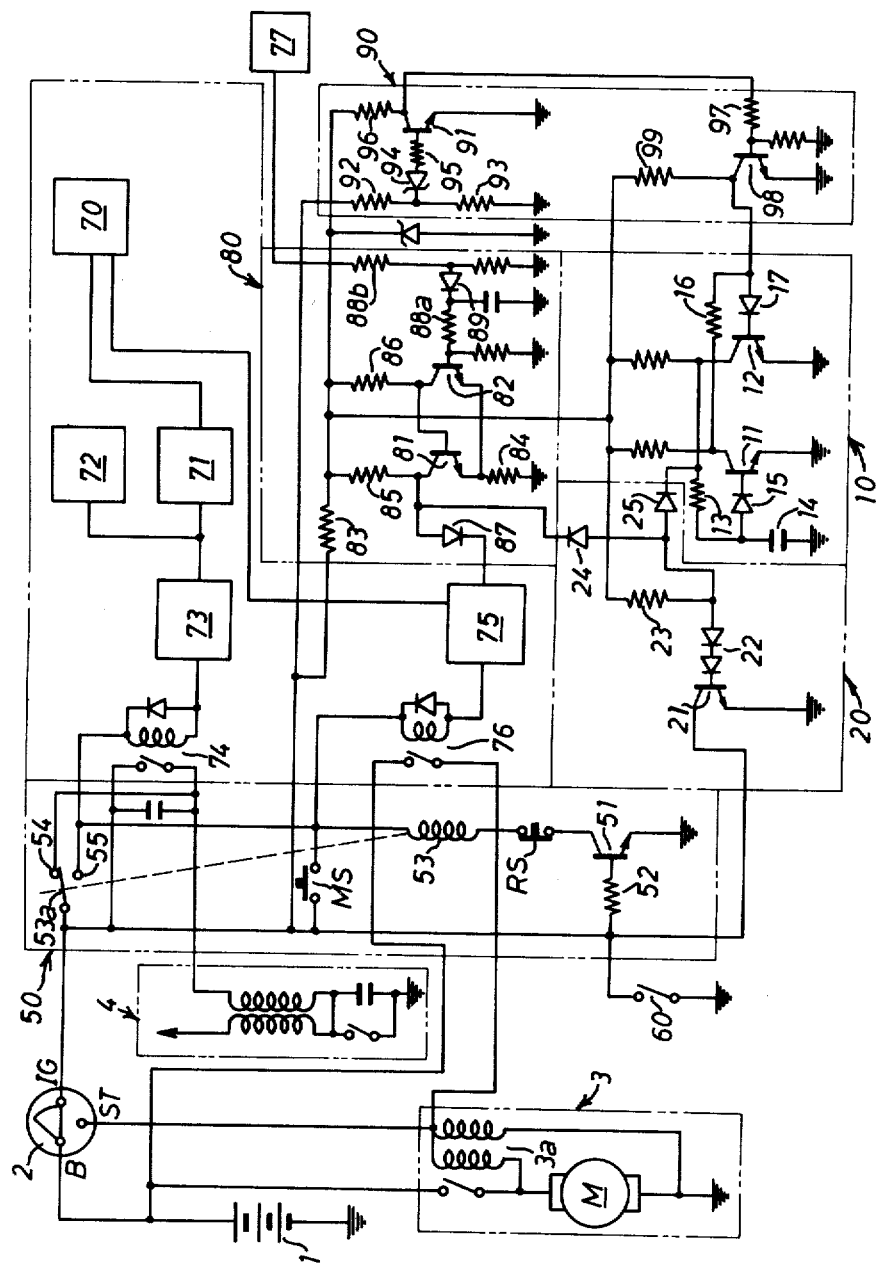

ENGINE AUTOMATIC CONTROL SYSTEM FOR VEHICLES

BACKGROUND OF THE INVENTION

The present invention relates to an automatic control system for an engine of vehicles, and more particularly to an improvement of the engine control system such as disclosed in U.S. Pat. No. 3,731,108 dated May 1, 1973, German Pat. No. 2,158,095 dated Sept. 6, 1973 and French Pat. No. 7,139,281 dated July 10, 1972.

In the engine control system disclosed in the mentioned Letters Patents, an engine is automatically stopped when the vehicle is arrested and the engine is automatically driven in response to the depression of the clutch pedal for starting the vehicle, both operations being carried out without operating the ignition switch. Repeated engine starting consumes electric energy out of a battery of the vehicle in a short period of time. Besides, as a modern fashion there is a tendency that a vehicle is installed with more numbers of electrically operated accessory devices. On the other hand, the stored capacity of a vehicle battery becomes rather smaller due to the improved high generating efficiency of an alternator.

It is very dangerous if the engine cannot be restarted after it is automatically arrested at a crossing or the like because of shortage of the electric energy out of the vehicle battery. It should be, therefore, very important in installation of an engine automatic control system of this kind to avoid any possible inconvenience and dangers caused by the shortage of the electric energy.

SUMMARY OF THE INVENTION

The prime object of the present invention is to provide an engine automatic control system, wherein function of the control system is automatically cancelled when the electric energy of the battery becomes short for starting the vehicle engine, thereby to overcome the inconvenient and dangerous demerits existing with the conventional type of engine automatic control system.

Another object of the present invention is to provide an engine automatic control system, wherein provided are a battery voltage detecting device for detecting constantly the stored voltage of the vehicle battery and an electrically cancelling device for disabling the function of the system in response to detecting decrease of the stored voltage of the battery down to a predetermined low value by the voltage detecting device.

A further object of the present invention is to provide an engine automatic control system, wherein the control system can perform its function to initially start the engine even when the voltage decrease to the predetermined low value is detected, and the function of the control system is cancelled upon operation of the alternator of the vehicle.

BRIEF DESCRIPTION OF THE DRAWING

The above mentioned and further objects and features of the present invention will become clearer from the following description in reference with the accompanying drawing, which depicts a preferred embodiment of an engine automatic control system in accordance with the present invention.

DESCRIPTION OF THE PREFERRED EMBODIMENT

Now referring to the drawing, described in detail is an engine automatic control system in accordance with the present invention, which includes an ignition switch 2, an ignition circuit 4 connected to the IG terminal of the ignition switch 2 and an engine starter circuit 3 having a starter relay 3a which is connected to the ST terminal of the ignition switch 2 to selectively connect a starter M with an electric source 1 in the form of a vehicle battery. The mentioned constructional portions are of well-known type and heretofore generally in use for motor-driven vehicles.

The engine automatic control system comprises a switching device 70 including a first switch to be closed by initial depression of a clutch pedal of the vehicle and a second switch to be closed by full disengaging operation of clutch means of the vehicle, a speed detecting circuit 72 to detect the speed of the vehicle, and an engine rotation holding/arresting circuit 73. The engine rotation holding/arresting circuit 73 operates in response to signals applied thereto from the first switch through a delay circuit 71 and from the speed detecting circuit 72 to control the operation of a relay 74 so as to maintain the engine ignition circuit 4 conductive while the vehicle runs and to make the engine ignition circuit 4 non-conductive when the vehicle is arrested. The delay circuit 71 is to inhibit the non-conductive state of the ignition circuit 4 upon start of the engine for a predetermined time to permit the vehicle to move. The relay 74 includes a normally open contact interposed between the IG terminal of the ignition switch 2 and the ignition circuit 4 to control the energization of the ignition circuit 4.

The engine automatic control system further comprises a starter conducting circuit 75 to operate a relay 76 so as to connect the electric source 1 with the starter M in response to the closing operation of the second switch and a starter cut-off circuit 80 for detecting the start of engine rotation caused by the starter M and deactivating the starter conducting circuit 75 to cut off current supply to the starter M. The relay 76 includes a normally open contact interposed between the electric source 1 and the relay 3a for the starter M. The coils of the relays 74 and 76 are connected respectively to the ignition switch 2 by way of a self-holding circuit 50 which comprises a relay 53 and a transistor 51. [Further details for the constructions of the switching device 70, the speed detecting circuit 72, the engine rotation holding/arresting circuit 73 and the starter conducting circuit 75 should well be referred to U.S. Pat. No. 3,731,108.]

Within the self-holding circuit 50, the transfer contact 53a of the relay 53 normally engages with an input terminal 54 of the ignition circuit 4 and the coil of the relay 53 is connected at its one end to the electric source 1 through a manual set switch MS of a push button type and the ignition switch 2 and to an input terminal 55 of the relay 74. The coil of the relay 53 is further connected at its other end to the collector of the transistor 51 through a manual release switch RS of a normally closed type. The transistor 51 is connected at its base to the electric source 1 through a resistor 52 and the ignition switch 2 and grounded at its emitter. The base of the transistor 51 is also grounded across the resistor 52 and an automatic release switch 60 of a normally open type. The automatic release switch 60 is such a normally open one as provided in the vehicle door to be closed by opening of the door or in the operator's seat to be closed when the operator leaves his seat. While the automatic release switch 60 is normally opened with the ignition switch 2 in its operative condition, the transistor 51 is conditioned to its conductive state by bias voltage appearing at its base. Thus, when the manual set switch MS is pushed, the relay 53 is energized under the conduction of the transistor 51 to engage the transfer contact 53a with the input terminal 55. After the release of the manual set switch MS, the energization of the relay 53 is maintained by the engagement of the transfer contact 53a with the input terminal 55. This completes preparation of the operation of the automatic control system. Under this condition, when the operator leaves the vehicle with the ignition switch 2 in its operative condition, the conduction of the transistor 51 is cancelled by closure of the automatic release switch 60. This deenergizes the relay 53 and the transfer contact 53a returns to its original position, thereby to cancel the function of the automatic control system.

The starter cut-off circuit 80 includes a schmitt circuit which comprises transistors 81 and 82. The transistor 81 is connected at its collector to the starter conducting circuit 75 through a diode 87 and to the electric source 1 through resistors 85 and 83 and the ignition switch 2. The transistor 82 is connected at its collector to the electric source 1 through a resistor 86, the resistor 83 and the ignition switch 2 and further connected at its base by way of resistors 88a and 88b and a diode 89 to an alternator 77 driven by the vehicle engine. The emitters of the transistors 81 and 82 are grounded through a resistor 84.

The engine automatic control system further comprises a voltage detecting circuit 90 to detect the stored voltage of the vehicle battery 1 and to generate a signal therefrom when the stored voltage decreases to or below a predetermined low value. The voltage detecting circuit 90 includes resistors 92 and 93 in series with the vehicle battery 1, a zener diode 94 connected at its cathode to a junction of the resistors 92 and 93, and a transistor 91 connected at its base to the anode of the zener diode 94 through a resistor 95. The transistor 91 is connected at its collector to the vehicle battery 1 through a resistor 96 and the resistor 83 and further to the base of a transistor 98 through a resistor 97. The transistor 98 is connected at its collector to a memory circuit 10 and the battery 1 through a resistor 99 and the resistor 83. With this voltage detecting circuit 90, until voltage appearing at the junction of the resistors 92 and 93 is lowered to the predetermined low value, the zener diode 94 is conducted to make the transistor 91 conductive and the transistor 98 non-conductive. When the voltage applied to the cathode of the zener diode 94 decreases to or below the predetermined low value, the zener diode 94 becomes non-conductive to turn off the transistor 91 and turn on the transistor 98.

The memory circuit 10 is substantially composed of a conventional bistable multivibrator including transistors 11 and 12. The base of the transistor 12 is connected to the collector of the transistor 98 through a diode 17 and further to the collector of the transistor 11 through the diode 17 and a resistor 16. The transistor 11 is grounded at its base through a diode 15 and a capacitor 14. The base of the transistor 11 is also connected to the battery 1 by way of the diode 15, a resistor 13, a diode 25, a resistor 23, the resistor 83 and the ignition switch 2 in sequence. In this memory circuit 10, as long as the transistor 98 is conditioned to be turned off upon turning on the ignition switch 2, the transistor 12 is conditioned to its conductive state, while the transistor 11 is conditioned to its non-conductive state. This initial conditioning is produced due to the resistors 13 and the capacitor 14 for the transistor 11. Thus, when the transistor 98 is turned on, the bistable multivibrator is inverted to memorize the decrease of the stored voltage of the battery 1 when it is lowered to or below the predetermined low value. This memorized condition within the memory circuit 10 will be maintained as long as the stored voltage stays at or below the predetermined low value and the ignition switch 2 is closed. When the ignition switch 2 is closed after it is once opened, the memory circuit 10 will be conditioned either to its initial or memorized state in response to the voltage value of the vehicle battery 1 regardlessly of the operation of the manual set switch MS.

A NAND circuit 20 comprises a transistor 21 of which the base is connected to the output of the starter cut-off circuit 80 by way of diodes 22 and a diode 24. The base of the transistor 21 is also connected to the battery 1 by way of the diodes 22, a resistor 23, the resistor 83 and the ignition switch 2 in sequence and to the base of the transistor 11 by way of the diodes 22, the diode 25, the resistor 13 and the diode 15. The transistor 21 is further connected at its collector to the base of the transistor 51 of the self-holding circuit 50 through the resistor 52. With this NAND circuit 20, the transistor 21 is normally turned off and will be turned on under such conditions as the starter cut-off circuit 80 generates voltage responsive to the operation of the alternater 77 while the transistor 11 is conditioned to its conductive state and the transistor 12 is turned off.

In this embodied control system, the resistors 84 and 13 are so selected that the resistance value of the resistor 13 is larger than that of the resistor 84. Therefore, the transistor 21 will not be energized even when the two transistors 11 and 81 are conductive under such a condition that the memory circuit 10 is in its memorized condition and the alternator 77 is not yet operated with both of the switches 2 and MS closed. This means that even when the battery voltage value is at or below the predetermined one, the vehicle engine can be started by way of this system but only once and soon after the engine starts its rotation, which means the operation of the alternator 77, the transistor 21 will be conducted to cancel the function of the self-holding circuit 50. Thus, the engine keeps its rotation by way of the conventional ignition circuit 4.

Hereinafter the operation of the engine control system of the present invention will be described. When the manual set switch MS is pushed during the travelling of the vehicle, the relay 53 is energized under the conduction of the transistor 51 to engage the transfer contact 53a with the input terminal 55. After the release of the manual set switch MS, the energization of the relay 53 is maintained by the engagement of the transfer contact 53a with the input terminal 55 to keep the activation of the engine control system. Under this condition, the engine rotation holding/arresting circuit 73 functions to energize the relay 74 by means of signal generated from the speed detecting circuit 72 to hold the rotation of the engine.

When the vehicle is arrested at a crossing with the clutch pedal depressed, the engine rotation holding/arresting circuit 73 sequentially energized the relay 74 by signal applied thereto from the first switch of the switching device 70 to maintain current supply to the ignition circuit 4. Under this condition, after the releasing of the clutch pedal with the transmission conditioned to its neutral position, the engine rotation holding/arresting circuit 73 deenergizes the relay 74 to block the current supply to the ignition circuit 4 so as to automatically arrest the rotation of the vehicle engine.

For starting the vehicle, the clutch pedal is depressed to close the first and second switches of the switching device 70. Then, the engine rotation holding/arresting circuit 73 energizes the relay 74 in response to the closure of the first switch to connect the electric source 1 with the ignition circuit 4 and, in turn, the starter conducting circuit 75 energizes the relay 76 in response to the closure of the second switch to operate the starter M so as to rotate the vehicle engine and the alternator 77. [In this case, the transmission may be conditioned to any position thereof.] Subsequently, when the alternator 77 applies bias voltage to the base of the transistor 82 to invert the schmitt circuit of the starter cut-off circuit 80, the starter conducting circuit 75 is deactivated in response to voltage appearing at the collector of the transistor 81 to deenergize the relay 76 to stop the rotation of the starter M. In this instance, even when the clutch pedal is released to open the first and second switches, the delay circuit 71 functions to activate the engine rotation holding/arresting circuit 73 so as to maintain the energization of the relay 74 for a predetermined period of time to enable the start of the vehicle.

While the operation of the vehicle engine is automatically controlled by the engine control system, under the condition that the stored voltage of the vehicle battery 1 is maintained over the predetermined low value decided within the voltage detecting circuit 90, the memory circuit 10 is conditioned to the initial state thereof and the transistor 21 of the NAND circuit 20 remains non-conductive to maintain the conduction of the transistor 51 of the self-holding circuit 50.

When the stored voltage of the battery 1 is lowered to or below the predetermined low value, the transistor 91 of the voltage detecting circuit 90 is turned off to make the transistor 98 conductive. The conduction of the transistor 98 inverts the bistable multivibrator of the memory circuit 10 to memorize the decrease of the battery voltage.

In the case the decrease of the battery voltage is detected by the voltage detecting circuit 90 while the vehicle is travelling, the transistor 21 is instantly turned on in response to the memorizing operation of the memory circuit 10 under the activation of the starter cut-off circuit 80 to deenergize the transistor 51 of the self-holding circuit 50. This deenergizes the relay 53 to release the self-holding circuit 50. Consequently, the operation of the engine control system is cancelled, while the ignition circuit 4 is directly connected with the battery 1 by way of the engagement of the transfer contact 53a with the input terminal 54. Furthermore, in the case the decrease of the battery voltage is detected by the voltage detecting circuit 90 while the vehicle is arrested, after the starter M is operated by the starter conducting circuit 75, the transistor 21 of the NAND circuit 20 is turned on in response to the activation of the starter cut-off circuit 80 to make the transistor 51 of the self-holding circuit 50 non-conductive. This de-energizes the relay 53 to release the self-holding circuit 50. Consequently, the operative condition of the engine control system is cancelled, while the ignition circuit 4 is directly connected with the battery 1 by way of the engagement of the transfer contact 53a with the input terminal 54.

Moreover, when the vehicle is arrested with the engine control system in its operative condition, the engine automatically stops. Under this condition, if the operator leaves the vehicle with the ignition switch 2 in its operative condition, the automatic release switch 60 is closed to block the base current of the transistor 51 so as to cause the non-conduction of the transistor 51. Thus, the transfer contact 53a is subsequently returned to its original position and the function of the engine control system is cancelled. This automatic cancellation prevents another operator who does not know the installation of the automatic control system of the vehicle from dangers caused by unexpected start of the vehicle by depression of the clutch pedal. He is also protected against dangers caused by his mental confusion when the engine of the vehicle unexpectedly stops upon arresting the vehicle at the crossing and the like.

Although in the above mentioned embodiment the transistor 21 is connected by way of the memory circuit 10 to the voltage detecting circuit 90 and to the output of the starter cut-off circuit 80, the memory circuit 10 may be eliminated and the base of the transistor 21 may be directly connected to the collector of the transistor 98 within the voltage detecting circuit 90. In this case, the transistor 21 is immediately turned on when the transistor 90 is energized.

Having thus described the preferred embodiment of the invention it should be understood that numerous structural modifications and adaptations may be resorted to without departing from the spirit of the invention.

What is claimed is:

1. In an engine automatic control system for a vehicle having an ignition switch for selectively connecting an electric source in the form of a battery with an engine starter and an engine ignition circuit comprising switch means to be closed by disengaging operation of clutch means of the vehicle, a starter conducting circuit for connecting said electric source with said starter in response to the closing operation of said switch means, a starter cut-off circuit for detecting the start of engine rotation caused by said starter and cutting off current supply to said starter, speed detecting means for detecting the movement of the vehicle, and an engine rotation holding/arresting circuit controlled by said switch means for connecting said electric source with said ignition circuit in response to the closing operation of said switch means and controlled by said speed detecting means for maintaining said engine ignition circuit conductive while the vehicle runs and for making said ignition circuit nonconductive when the vehicle is arrested, the improvement comprising setting means interposed between said ignition switch and said ignition circuit for selectively setting said engine control system to its operative condition and cancelling means coupled with said setting means for automatically cancelling the operative condition of said engine control system when the stored voltage of said battery is lowered to or below a predetermined low value.

2. An engine automatic control system as claimed in claim 1, wherein said cancelling means comprises a voltage detecting circuit for detecting the stored voltage of said battery and generating an output signal therefrom when the stored voltage of said battery decreases to or below a predetermined low value and means for releasing the setting condition of said setting means in response to the output signal from said voltage detecting circuit.

3. An engine automatic control system as claimed in claim 1, wherein said cancelling means comprises a voltage detecting circuit for detecting the stored voltage of said battery and generating an output signal therefrom when the stored voltage of said battery decreases to or below a predetermined low value and means for releasing the setting condition of said setting means in response to the output signal from said voltage detecting circuit under the activation of said starter cut-off circuit.

4. An engine automatic control system as claimed in claim 1, wherein said cancelling means comprises a voltage detecting circuit for detecting the stored voltage of said battery and generating an output signal therefrom when the stored voltage of said battery decreases to or below a predetermined low value, a memory circuit connected with the output terminal of said voltage detecting circuit for memorizing the output signal of said voltage detecting circuit, and a NAND circuit for cancelling the setting condition of said setting means in response to output signals generated from said memory circuit and said starter cut-off circuit during the rotation of the vehicle engine.

5. An engine automatic control system as claimed in claim 4, wherein said voltage detecting circuit comprises a zener diode connected with said battery through said ignition switch to be normally energized and deenergized when the stored voltage of said battery lowers to or below a predetermined low value, a first transistor connected at its base with said battery through said zener diode to be turned off in response to the deenergization of said zener diode and a second transistor connected at its base with the collector of said first transistor and said battery to be turned on when said first transistor is turned off, said memory circuit being connected with the collector of said second transistor.

6. An engine automatic control system system as claimed in claim 4, wherein said memory circuit comprises a bistable multivibrator interposed between the output terminal of said voltage detecting circuit and the input terminal of said NAND circuit to be inverted in response to the output signal applied thereto from said voltage detecting circuit to generate an output signal therefrom to be applied to the input terminal of said NAND circuit.

7. An engine automatic control system as claimed in claim 4, wherein said NAND circuit comprises a transistor connected at its base with the output terminals of said memory circuit and said starter cut-off circuit, the collector of said transistor being connected with said setting means to release the setting condition of said setting means.

8. An engine automatic control system as claimed in claim 1, wherein said setting means is a self-holding circuit connected with said battery through said ignition switch and provided therein with a self-holding relay to be energized under the operative condition of said ignition switch, the energization of said self-holding relay connecting said battery with said engine control system and said cancelling means comprises a voltage detecting circuit for detecting the stored voltage of said battery and generating an output signal therefrom when the stored voltage of said battery decreases to or below a predetermined low value and means for deenergizing said self-holding relay in response to the output signal from said voltage detecting circuit under the activation of said starter cut-off circuit.

9. An engine automatic control system as claimed in claim 8, wherein said cancelling means further comprises a memory circuit connected with the output terminal of said voltage detecting circuit for memorizing the output signal of said voltage detecting circuit, and said means for deenergizing said self-holding relay is a NAND circuit for deenergizing said self-holding relay in response to output signals generated from said memory circuit and said starter cut-off circuit during the rotation of the vehicle engine.

10. An engine automatic control system as claimed in claim 8, wherein said self-holding circuit further comprises a release switch coupled therewith for automatically deenergizing said self-holding relay when an operator leaves the vehicle.

\* \* \* \* \*